United States Patent [19]

Podobinski

[11] Patent Number: 4,707,761
[45] Date of Patent: Nov. 17, 1987

[54] METHOD AND APPARATUS FOR DETECTING THE RATE OF RISE OF DIRECT CURRENT

[75] Inventor: David J. Podobinski, Washington, Pa.

[73] Assignee: Consolidation Coal Company, Pittsburgh, Pa.

[21] Appl. No.: 735,454

[22] Filed: May 17, 1985

[51] Int. Cl.$^4$ ............................................. H02H 3/32
[52] U.S. Cl. ...................................... 361/93; 307/353; 307/517; 324/51; 361/5; 361/63
[58] Field of Search ...................... 361/93, 94, 62, 63, 361/64, 65, 66, 2, 5, 6, 7; 324/51, 103 R, 103 D; 307/351, 353, 517

[56] References Cited

U.S. PATENT DOCUMENTS

| | | | |
|---|---|---|---|
| 2,928,997 | 3/1960 | Edmunds | 361/99 |
| 4,295,099 | 10/1981 | Evans | 307/353 |
| 4,344,037 | 8/1982 | Ragsdale | 307/517 |
| 4,410,817 | 10/1983 | Chi et al. | 307/351 |
| 4,439,803 | 3/1984 | Baba | 361/104 |
| 4,455,509 | 6/1984 | Crum et al. | 361/111 |
| 4,634,895 | 1/1987 | Luong | 307/353 |

Primary Examiner—A. D. Pellinen
Assistant Examiner—Jeffrey A. Gaffin
Attorney, Agent, or Firm—Stanley J. Price, Jr.

[57] ABSTRACT

A low level fault condition in a mine trolley system is distinguished from a normal system load by detection circuitry connected to the trolley system between a main circuit breaker and the trolley wire. The detection circuitry monitors the current through the trolley wire and samples the current at preselected intervals of time to detect a rise in current through the trolley wire. The rate of current rise is compared to an adjustable reference signal. If the current rise exceeds a preselected rate, then activation circuitry of the main circuit breaker is latched to determine if the net current change is above a preset limit. If other available protective devices, such as fuses, in the trolley system fail to isolate the faulted circuitry within a preselected period of time after an excessive current rise is detected, then the activation circuitry is tripped to open the normally closed contacts of the main circuit breaker. In this manner the entire flow of current through the trolley wire is interrupted.

18 Claims, 11 Drawing Figures

METHOD AND APPARATUS FOR DETECTING THE RATE OF RISE OF DIRECT CURRENT

BACKGROUND OF THE INVENTION

1. Field of the Invention

This invention relates to method and apparatus for detecting low level faults in a direct current system and more particularly to method and apparatus for measuring the rate of current rise to detect low level short circuit current in a mint trolley system.

2. Description of the Prior Art

In many electrical systems the magnitude of a fault current associated with a short circuit is several times that of the normal load current. This is not the case for most coal mine trolley systems where the fault current might be as low as 125 percent of the normal load current. Because of the low current level of the faults, the circuit breakers may not detect the faults. In underground mining operations a direct current trolley system is utilized for the transportation of men, supplies, and coal from one location to another in the mine. In addition, the trolley system serves as a power source for stationary loads, such as lights, pumps, and heaters.

In a trolley system direct current circuit breakers must be set sufficiently high to allow tracked vehicles, such as locomotives moving trains of coal cars, to pass by the circuit breaker without tripping the circuit breaker. Also, modern track haulage equipment demands high current, for example, 3,000 amperes dc, and as a result rectifiers must often be tied together to meet these high current demands. A typical "coal train" consists of thirty to forty-five 20 ton coal cars and two 50 ton locomotives. A 50 ton locomotive typically uses four 200 horsepower series wound direct current traction motors.

Unlike most electrical power distribution systems, the magnitude of a short circuit current in a mine trolley system ranges between 125 and 150 percent of the expected system load current as opposed to several times that of the normal load current for a electrical power distribution system. The standard relay accuracy of known electro-magnetic overload relays is plus or minus 15 percent, allowing only a 10 percent safety factor. In addition fault current values cannot be guaranteed because of system degradation due to moving vheicles derailing and damaging feeder wires or rail bonds, acidic water attacking electrical conductors, and man-made splices loosening with age.

The major components of a direct current mine trolley system are the trolley/feeder wire system, the track/return feeder system, direct current rectifiers, and bore hole feeder cables. In many cases the trolley wire system may extend 20 miles in length. Trolly feeder wire, if used, is conventionally made of copper or aluminum. One or more feeder wires may be placed in parallel with the trolley wire. The voltage of a conventional trolley system is 300 or 600 volts dc. Insulated trolley wire hangers connect the trolley wire and the trolley feeder wire together. This parallel combination of the trolley wire and the trolley feeder wire serves as the "hot" conductor of a dc trolley system.

The size and weight of the trolley rails used in a mine is dependent on the type and weight of the load being transported along the rail system. Conventionally each rail is 30 feet in length. The rails are joined by a bolted connection and a "bond" is welded across each joint to assure a good electrical connection. Both rails are "cross-bonded" together at 200 foot intervals to provide an electrical connection between the two rails. Occasionally, a return feeder wire is run in parallel with the track system to increase the overall current carrying capacity and to provide a continuous electrical connection to the mine rectifier. It is also well-known that the mechanical connections between the rails can become loose and the rail bonds and crossbonds damaged by derailments of track-mounted equipment. The track and return feeder wire are also connected together at intervals to serve as the "return" conductor of the direct current trolley system.

It is the conventional practice to supply an underground mine with incoming three phase alternating current voltage, in the range between about 2,300 to 12,470 volts ac, which is converted by mine rectifiers to either 300 or 600 volts dc at a power rating of 300, 500, 750, or 1,000 kw. Rectifiers are selectively located in the mine based upon their capacity and need. It is a conventional practice to install rectifiers near the track entry for efficient connection to the rail and to the trolley. Large mines require large rectifiers which generally are located on the surface and are connected to the trolley wire system by means of bore hole cables. The length of the cable depends upon the depth of the coal seam. Generally there are two "hot" and two "return" conductors per cable. In this manner the current carrying capacity of the cable is increased and the voltage drop across the cable is minimized.

Thus with the above described modern trolley system used in an underground mine numerous trolley system/load combinations exist. These combinations, particularly at the load levels encountered, make it difficult for the known overload detection means to distinguish between a low current fault and a high current legitimate load on the trolley system. Upon the occurrence of an arcing fault, the increased system resistance and/or decreased driving voltage may not allow the necessary fault current to flow, allowing the fault to go undetected.

Therefore, there is need for method and apparatus for detecting high resistance (arcing) fault magnitudes at least significantly less than the circuit breaker static trip threshold. The apparatus must be easily connected to the trolley system and nuisance tripping must be minimized. This requires consideration of a number of factors relating to the trolley system, such as the type and size of the trolley system, the trolley system voltage, and the location of insulators for electrically insulating one section of a trolley system from another.

While it is well known to utilize circuit breakers to provide protection of coal mine trolley systems, the size and speed of the track haulage equipment has increased to the point where current magnitude alone cannot be used to distinguish between a system fault and a legitimate trolley system load. A low level fault detection system is necessary for fault levels less than 300 amperes where the necessary circuit breakers are tripped but legitimate 5,000 ampere trolley system loading is allowed to occur. Therefore, there is need for apparatus operable to distinguish between a low level fault and legitimate trolley system loads.

SUMMARY OF THE INVENTION

In accordance with the present invention, there is provided apparatus for detecting a low level fault condition in an electrical system that includes a circuit breaker adapted to be connected in series with a direct current conductor. The circuit breaker is operable in a closed position to permit the flow of direct current through the conductor and in an open position to terminate the flow of direct current through the conductor. A shunt is connected in series with the conductor so that direct current flows through the shunt to the conductor. The shunt is operable to generate an input signal at a voltage proportional to the direct current flowing through the conductor. Isolation means generate an input signal proportional to the direct current flowing through the conductor. Means is provided for selecting the peak values of the waveform of the input signal and synchronizing on the peak values to provide an output signal corresponding to the peak values of the waveform. Means is provided for sampling the peak values of the waveform of the output signal over a selected time interval to determine the change in magnitude of the current through the shunt during the selected time interval. Comparator means compares the change in magnitude of the current through the shunt to a critical value of a change in current for the selected time interval to detect the presence of a critical rate of an increase in current through the shunt. A trip circuit latched to the comparator means monitors the net change in current for preselected period of time in the event a critical rate of increase in current is detected. The trip circuit is energized to open the circuit breaker and terminate the flow of current therethrough when the critical rate of rise of current is detected and the net change in current exceeds a preselected limit.

Further in accordance with the present invention, there is provided a method for detecting a low level fault condition in an electrical system that includes the steps of feeding direct current from a power source to an electrical system including a current carrying conductor. A fault condition in the electrical system is isolated without having to interrupt the entire flow of current to the conductor. The presence of a fault condition is detected in the electrical system by monitoring the rate of current rise through the conductor for a preselected time interval. The rate of current rise for the preselected time interval is compared to a critical value. The increase in current through the conductor is measured after the preselected time interval. The entire flow of current to the conductor is interrupted in the event the fault condition is not isolated in the electrical system when the rate of current rise has exceeded the critical value and the increase in current after the preselected current time interval has exceeded the preselected limit.

Additionally the present invention is directed to apparatus for detecting a low level fault condition in a mine trolley system that includes a trolley system circuit including a trolley wire. A source of direct current supplies direct current power to the trolley system circuit. A circuit breaker is positioned between the source and the trolley wire for interrupting current flow to the trolley wire in the event of a fault condition in the trolley system. A fuse is connected to the trolley system circuit for opening the circuit to isolate the fault condition in the circuit without the need to trip the circuit breaker and interrupt the flow of current to the trolley wire. A current detector is positioned in the trolley system circuit between the circuit breaker and the trolley wire for tripping the circuit breaker in the event that the current rise due to the fault condition exceeds a predetermined rate of current rise and the increase of current after an interval of time exceeds a predetermined limit. The current detector includes means for measuring the net change in current from the time the fault condition occurs to a preselected time thereafter and comparing the net change in current with the predetermined rate of current rise. Means is provided for detecting and measuring the net change in current after the preselected time and trips the circuit breaker when the net change in current exceeds the predetermined limit.

The current detector includes a sample and hold circuit that receives an input signal proportional to the current through the fault. The same and hold circuit monitors the input signal to determine if the rate of change and the magnitude of the input signal over a preselected interval of time exceeds a predetermined ratio of the change in current for a time interval. This rate of current change is compared to a reference signal which is proportional to the predetermined limit. A potentiometer associated with the sample and hold circuit permits a variation in the setting of the critical level. Thus, the critical level of change in current for the time interval selected is a function of the reference signal.

The circuit detector is tripped when the critical rate of current rise for the selected time interval reaches the predetermined limit. A trip latch circuit is responsive to the sample and hold circuit and is operable to trip the circuit breaker if an excessive rate of current rise and an excessive net change in the current through the fault are detected. An output signal from the trip latch circuit energizes the relay of the circuit breaker to open the contacts of the relay and trip the circuit breaker.

Even if an excessive rate of current rise is detected the contacts of the circuit breaker are not opened until an excessive net change in the magnitude of the current is detected. If the net change in current magnitude does not exceed the predetermined limit, then the detection circuitry is reset.

Accordingly, the principal object of the present invention is to provide apparatus for detecting a low level fault condition on a direct current trolley system used in an underground mine.

Another object of the present invention is to provide method and apparatus for detecting a low level fault condition in a direct current electrical system in order to trip a main circuit breaker while allowing high system load currents to flow through the electrical system without actuation of the circuit breaker.

A further object of the present invention is to provide circuitry for distinguishing between a low current fault and a high current load on an underground mine trolley system in order to trip a main circuit breaker upon the occurrence of a fault condition which may otherwise go undetected by the circuit breaker.

Another object of the present invention is to provide method and apparatus for tripping a circuit breaker in an electrical system upon the occurrence of a low level fault based when both the rate of rise of current and the net current change in a given period of time exceed predetermined critical levels.

These and other objects of the present will be more completely disclosed and described in the following specification, the accompanying drawings, and the appended claims.

DESCRIPTION OF THE PREFERRED EMBODIMENT

Figure 1:
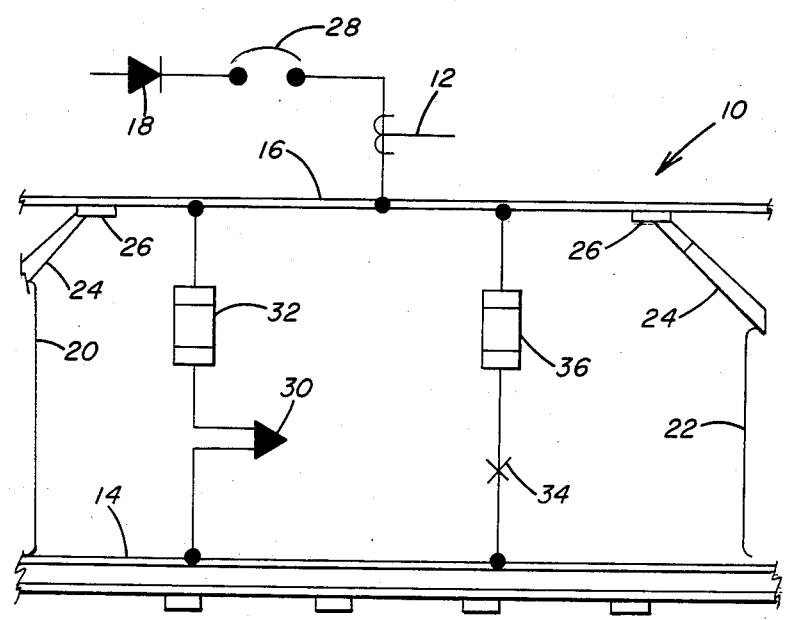
FIG. 1 is a schematic diagram of a mine trolley system, illustrating a fault through a fuse.
Figure 2:
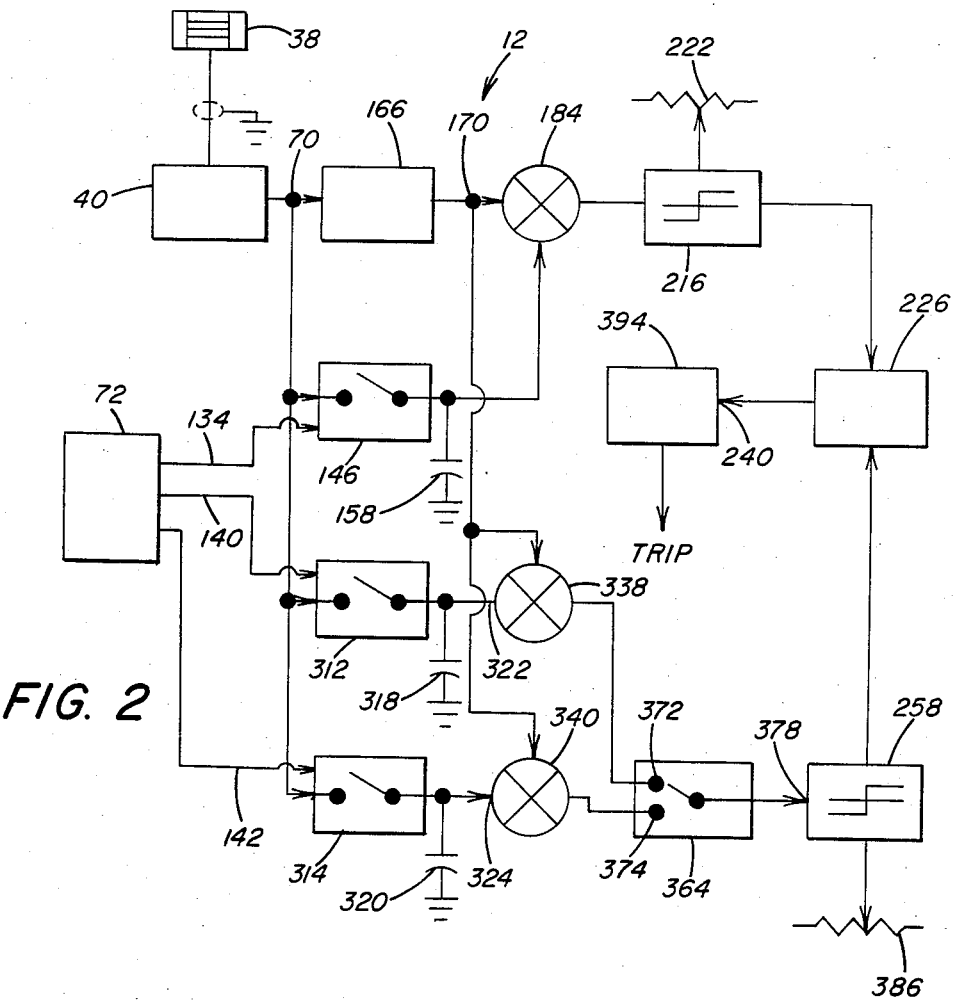
FIG. 2 is a block diagram of a fault detection circuit for a mine trolley system.

Referring to the drawings, and particularly FIGS. 1 and 2, there is illustrated a mine trolley system 10 that includes a circuit 12 for detecting a low level trolley system fault by measuring the rate of rise of current and the duration of the current pulse for low level faults that occur in order to quickly and safely deenergize the system. The detection circuit 12 is operable in the trolley system 10 to allow downstream circuit breakers, fuses, or other protective devices to isolate the faulted circuitry rather than trip off the main feeder circuit breaker. With the trolley system 10 having the detection circuit 12, if a fault should occur the rate of rise detection responds as the fault current rises at approximately 1,000 amperes/msec.

The trolley system 10 shown in FIG. 1 is an example of a known system that includes haulage track 14, a trolley wire 16 that is suitably hung from a hanger with insulators (not shown). A conventional trolley system may include a return feeder wire and a trolley feeder wire (both not shown). The trolley system distributes dc power throughout the mine, and in a larger mine the trolley wire system may extend 20 miles in length. Conventionally the trolley wire is made of harddrawn copper with a current carrying capacity of a 400 kcmil. copper wire. The trolley wire and the trolley feeder wire (if present) are suspended approximately 6 feet above the rails by means of insulated trolley wire hangers. The hangers serve to connect the trolley wire and the trolley feeder wire together. The haulage track 14 is formed by individual rails, each about 30 feet in length, joined together by bolting. A "bond" is welded across each joint to assure a good electrical connection.

Solid state rectifier units, such as schematically illustrated by rectifier 18 in FIG. 1 convert ac power to dc power. For example, the rectifier 18 converts incoming primary three phase ac voltage to either 300 or 600 volts dc at a power rating of 300, 500, 750, or 1,000 kw. Each rectifier 18 consists a high impedance transformer and a conventional three phase full wave rectifier bridge assembly, the details of which are beyond the scope of the present invention and will not be described herein. The location of the rectifier is determined by the coal seam height, the capacity of the rectifier unit, and the number of rectifiers needed. The rectifiers 18 are usually located near the track entry, and less than 50 feet of wire is required to make the connections to the track 14 and to the trolley wire 16. It is also the practice in large mines requiring several rectifiers to locate the rectifiers on the surface and connect them to the trolley system 10 by bore hole cables.

A wide variety of track equipment is used in a mine trolley system, such as locomotives for transporting mined material, personnel carriers, mine maintenance equipment, and stationary equipment, such as generators, pumps, and lighting. FIG. 1 schematically illustrates a personnel carrier 20 and a locomotive 22, such as a 50 ton mine locomotive provided with four 200 horsepower traction motors. The traction motors for both the personnel carrier 20 and the locomotive 22 are electrically connected to the trolley wire 16 through a trolley pole 24 mounted on the respective vehicle. The trolley pole 24 includes a contact shoe 26 for completing the electrical connection to the trolley wire 16.

As further seen in FIG. 1, the rectifier 18 is connected by a feeder circuit breaker 28 to the trolley wire 16, and the detection circuit 12 is also connected to the trolley wire 16 between the trolley wire 16 and the circuit breaker 28. The trolley system 10 shown in FIG. 1 also includes a dewatering pump 30 connected by a fuse 32 between the haulage track 14 and the trolley wire 16. The personnel carrier 20, the locomotive 22, and the pump 30 all receive dc power from the mine rectifier 18. In the event of a fault 34, the fuse 36 opens to isolate the faulted circuit. With the fault detection circuit described, the circuit would recognize the fault 34 and also recognize that the fuse 36 had opened to isolate the fault 34, negating the need to open the feeder circuit breaker 28.

The fuse 36 is operable to remove the system fault, and the feeder circuit breaker 28 remains closed. However, if the fuse 36 fails to isolate the faulted circuit, then the net change in current after a preselected period of time, for example after 150 msec. would be large. Consequently, in accordance with the present invention, the feeder circuit breaker 28 opens by operation of the detection circuit 12. Preferably, the feeder circuit breaker 28 trips only when the critical rate of load current rise is exceeded and the net change in current after a period of time is excessive.

The components of the rate of rise detection circuitry 12 are diagrammatically illustrated in FIG. 2, and each of the circuit components of the detection circuit 12 are illustrated in greater detail in FIGS. 3–10. The detection circuit 12, as shown in FIG. 2, is connected to a load shunt 38 by an isolation amplifier section 40 shown in detail in FIG. 3. The isolation amplifier section 40 includes an isolation amplifier 42 operable to electrically isolate the low voltage operational amplifier circuitry from the high voltage normally on the shunt leads (up to 600 volts dc) and to provide input signal amplification necessary to the operational amplifier stages that follow.

The isolation amplifier 42 includes a plurality of terminals 44–50. Terminals 44 and 48 are connected to the load shunt 38. The terminal 44 is positive with respect to terminal 48. A resistor 52 compensates for different load shunt ratios that occur for an adjustable input gain.

The amplifier 42 also includes an output terminal 54 which is calibrated for a specific dc voltage and current through the load shunt 38. A potentiometer 56 is operable to zero the output of the isolation amplifier 42 when the input terminals are shorted together. The potentiometer 56 is connected to additional terminals 58 and 60 of the amplifier 42, and terminal 62 of the amplifier 42 is grounded.

Figure 3:
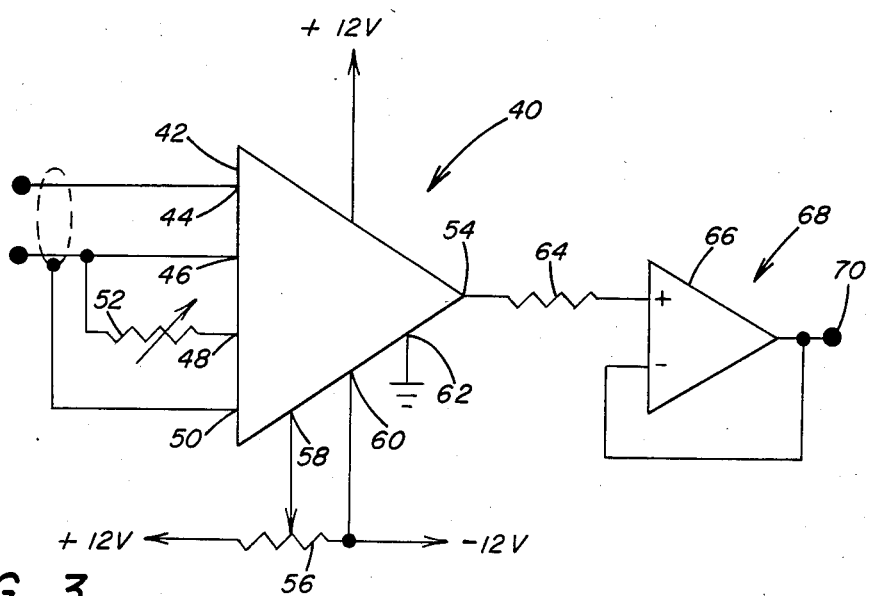
FIG. 3 is a schematic diagram of an isolation amplifier for use in the fault detection circuit for measuring the rate of rise of current to detect the presence of a low level fault in a mine trolley system.

As further seen in FIG. 3 a resistor 64 connected to the isolation amplifier output terminal 54 and amplifier 66 form a voltage follower network generally designated by the numeral 68. The network 68 provides a high impedance load for the output of the isolation amplifier 42. The network 68 also provides a relatively low impedance output at terminal 70. The resistor 64 is selected to protect the output of the amplifier 42 from a short circuit in the event the amplifier 66 fails.

Figure 11:
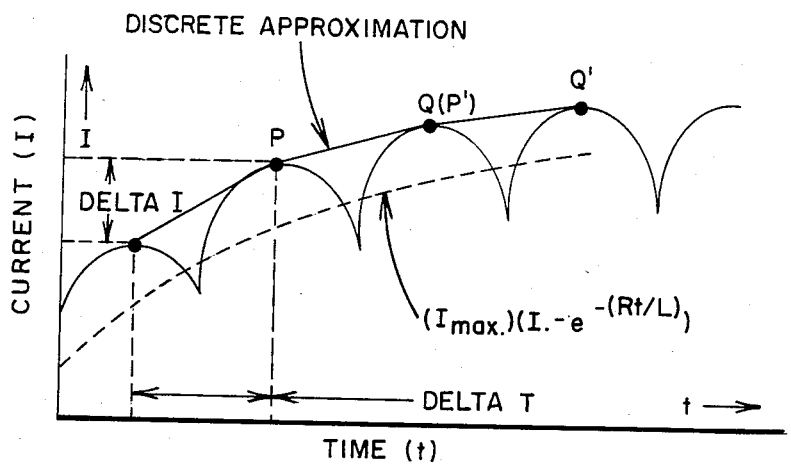
FIG. 11 is a graph of the waveform of the change in current over a period of time of the output from the isolation amplifier shown in FIG. 3.

The output at terminal 70 of the voltage follower network 68 is equal to the load shunt voltage multiplied by the gain of the amplifier 42. If the mine rectifier 18, as shown in FIG. 1, supplying the load is closed into a series R-L circuit, then, the voltage at terminal 70, FIG. 3, has a waveform as illustrated in FIG. 11 for a change in current over a period of time. The voltage waveform at the output terminal 70 is discontinuous at the points indicated. At these points the derivative of the waveform approaches infinity. The derivative of a change in current versus a change in time can be approximated as indicated by the continuous line shown in FIG. 11.

The waveform shown in FIG. 11 discloses that the derivative can be approximated by a change in current (delta I) for a change in time (delta T). This is a characteristic of a three phase, full-wave rectified waveform having 6 pulses per cycle at a frequency of 360 hertz and a period 2.77 msec. for an input frequency of 60 hertz. As further illustrated in FIG. 11 at "P", selected as a reference, a point "Q" (to +2.77 msec.) represnts the same point on the next cycle. The delta T is equal 2.77 msec. If "Q" is now renamed "P" the same procedure can be applied to the next pair of cycles but delta T would still be equal to 2.77 msec. This is determined by the input line frequency.

In the above manner, a descrete method of differentiation can be used to analyze the entire waveform, both in the transient state and steady state. The two obvious initial locations for point "P" would be the instant the rectifier diode commutation occurs and the point midway between successive diode commutations (the peak of the waveform). Thus, the peak point of the cycle is preferred.

Figure 4:
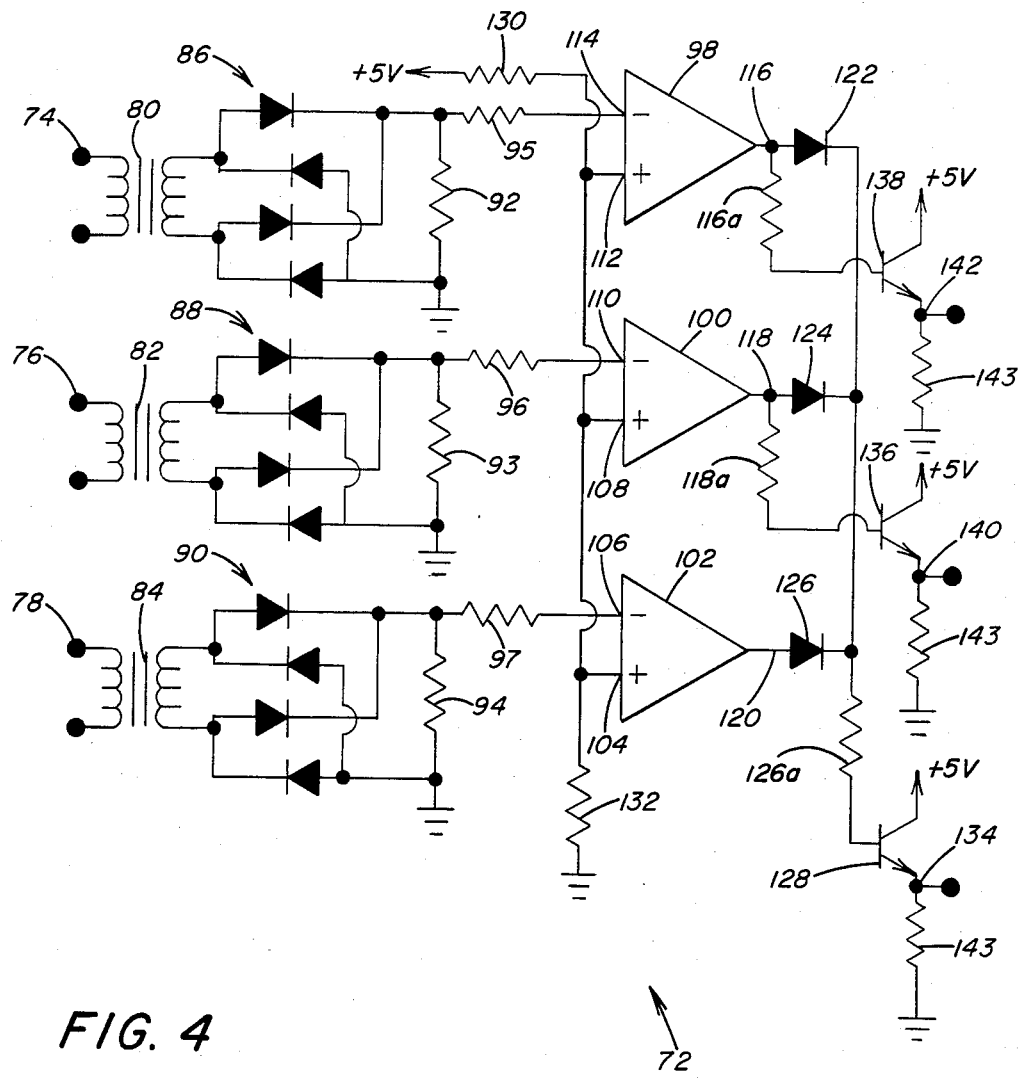
FIG. 4 is a schematic diagram of a synchronous clock circuit for receiving the amplified input signal from the isolation amplifier shown in FIG. 3.

The above is accomplished electronically by a clock circuit generally designated by the numeral 72 in FIG. 4. The clock circuit 72 is synchronized on the peaks of the direct current or the amplified voltage waveform of the output voltage from the isolation amplifier section 40 shown in FIG. 3.

The clock circuit 72 shown in FIG. 4 includes three ac phase inputs 74–78. The inputs 74–78 are fed into delta transformers 80–84 which step the voltage down from, for example, 228 volts ac or 444 vac to approximately 15 volts ac. The secondary windings of the transformers 80–94 are single phase, full wave rectified by diode bridge rectifiers 86–90. Connected across the respective diode bridge rectifiers 80–90 are resistors 92–94 which serve as loads to the bridge rectifiers 86–90 to provide for proper diode commutation. Each of the resistors 95–97 are, in turn, connected to operational amplifiers 98–102, respectively, which are used as switching operational amplifiers. With this arrangement, the output, for example, of amplifier 102 is +12 volts if the non-inverting input 104 is at a higher positive potential than the inverting input 106; otherwise, the output is zero volts. This same arrangement is also applicable for the non-inverting and inverting inputs 108 and 110 for the amplifier 100 and non-inverting and inverting inputs 112 and 114 for the amplifier 98.

The amplifiers 98–102 include output terminals 116–120, respectively, which are, in turn, connected to diodes 122–S126 which collectively form a three input 'or' gate so that if any of the three operational amplifier outputs 116–120 are at +12 volts then a transistor 128 is switched to a conductive state. Further resistors 130 and 132 form a voltage divider network to bias the non-inverting inputs 104, 108, and 112 of the operational amplifiers 98–102, respectively, at a preselected voltage, for example, approximately +0.25 volts. The transistor 128 is connected as an emitter follower and provides an output voltage at terminal 134. Additional transistors 136 and 138 are also connected as emitter followers and include output terminals 140 and 142 for generating timing pulses.

Resistors 116a, 118a and 126a, although not essential to the operability of this invention, limit the current flow to transistors 138, 136 and 128 respectively. The terminals 134, 140, and 142 are also connected through resistor 143 to ground. Thus the above described clock circuit 72 synchronizes on the peaks of the dc waveform, shown in FIG. 11, corresponding to the voltage output at terminal 70.

Figure 5:
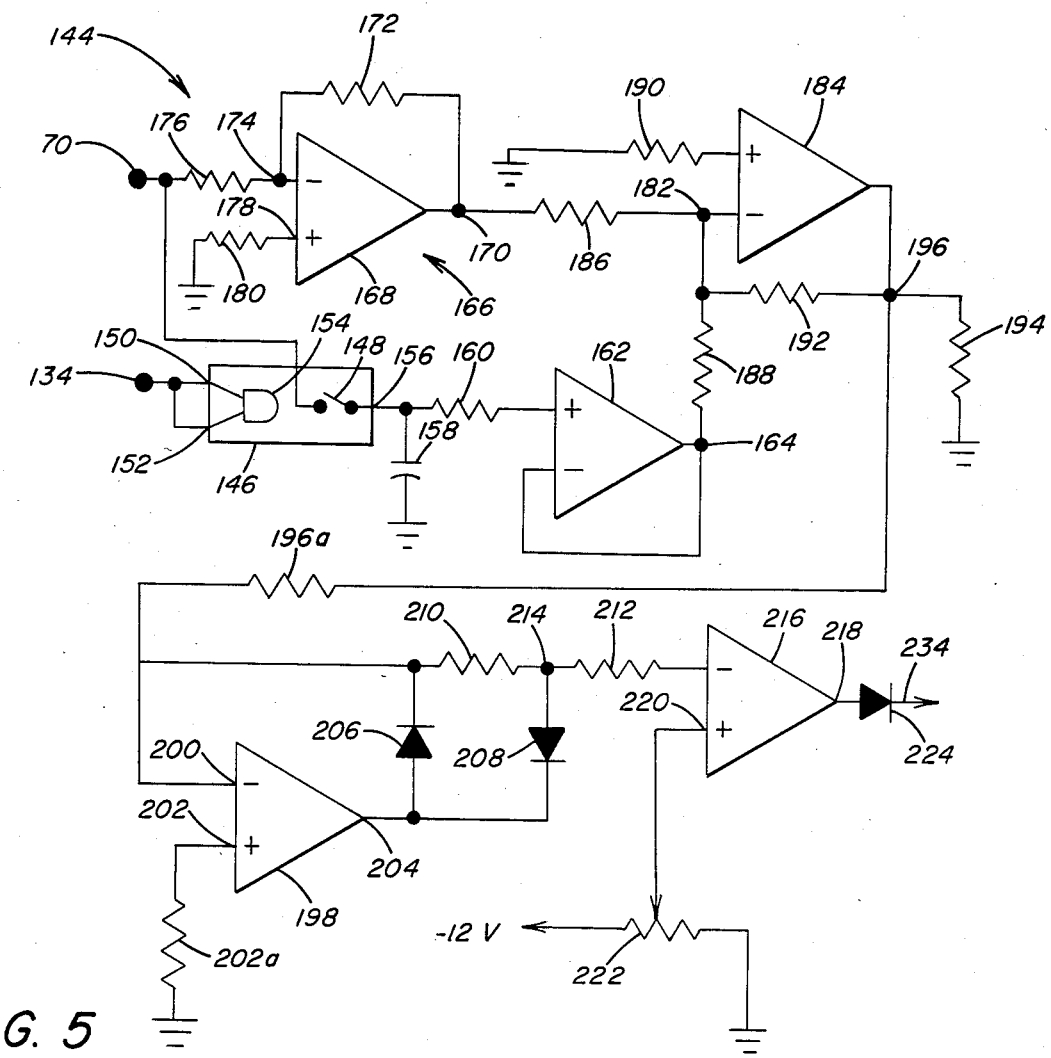
FIG. 5 is a schematic diagram of a sample and hold circuit for the detection circuit.

Now referring to FIG. 5, there is illustrated a sample and hold circuit generally designated by the numeral 144 that includes an integrated circuit 146 having a logically controlled field effect transistor switch 148 and a plurality of pins 150–156. When both pins 150 and 152 are a logic "1" level, the switch 148 between the pins 154 and 156 is "on"; otherwise, the transistor switch 148 is "off"; when in the "off" state, the transistor switch 148 exhibits an extremely high junction resistance, for example $10^{15}$ ohms. While in the "on" state, it exhibits a relatively low junction resistance, for example 50 ohms.

In addition, the sample and hold circuit 144, shown in FIG. 5, includes the additional elements of a capacitor 158, resistor 160, and operational amplifier 162. With this arrangement, when the voltage at terminal 134 is at a logic "1" (plus 5 volts), the voltage at pin 154 is impressed on capacitor 158. Preferably, the capacitor 158 is a high grade polyester capacitor with a high leakage resistance. When the voltage at input terminal 134 is at a logic "0" (0 volts), the voltage on the capacitor 158 at pin 156 is trapped because of the extremely high leakage impedances presented by the integrated circuit 146, operational amplifier 162, and capacitor 158. Further, the combination of a resistor 160 and operational amplifier 162 serve as a high impedance voltage follower so that the voltage at pin 156 equals the voltage at output terminal 164 of the amplifier 162.

The integrated circuit 146 is connected through the pin 154 to the terminal 70 which is also connected to a unity gain inverter circuit generally designated by the numeral 166. The circuit 166 includes an operational amplifier 168 having an output terminal 170 connected in a feedback circuit to resistor 172 and input terminal 174 and resistor 176. The operational amplifier 168 also includes an input terminal 178 connected through resistor 180 to ground.

The output terminal 170 of the operational amplifier 166 is connected to input terminal 182 of a summing operational amplifier 184. A plurality of resistors 186–194 determine the overall gain of the amplifier 184. The resistance of resistor 186 is equal to the resistance of resistor 188. The resistance of resistor 190 is equal to the parallel combination of resistors 186, 188, and 192. Resistor 194 serves as an output load for the amplifier 184 at output terminal 196. With the arrangement, the voltages at terminals 134, 170, 164, and 196 have discrete waveforms which are determined by the exponentially increasing voltage at output terminal 70 for the isolation amplifier section 40, shown in FIG. 3.

Referring to FIG. 5, the voltage at terminal 196 is a measure of the change in current for a preselected time period. Further, the voltage at terminal 164 is the stored voltage corresponding to the load shunt current at a preselected time, for example t equals zero. The voltage at terminal 170 is the negative of the real time load current for the period of time between zero and 2.77 msec. At the time t equals 2.76 msec. the difference in voltage between terminals 170 and 164 is the change in current, referred to above, for a period of time of approximately 2.77 msec. Because of the signal inversion present in the summing junction, the voltage at terminal 196 is negative for a change in current for a period of time greater than zero and positive for a change in current for a period of time less than zero.

Further the sample and hold circuit 144 shown in FIG. 5 includes an additional operational amplifier 198 having input terminals 200 and 202 and an output terminal 204 connected to a pair of diodes 206 and 208.

Although not essential to the operability of this invention, resistor 196a limits the current flow from operational amplifier 184 to operational amplifier 198. The positive terminal 202 of operational amplifier 198 is connected to ground through resistor 202a. Although also not essential to the operability of this invention, resistor 202a protects the input of operational amplifier 198 from excessive current in the event of failure of the operational amplifier 184. Resistors 210 and 212 together with the diodes 206 and 208 and the operational amplifier 198 form an active rectifier circuit which functions as an ideal diode in which case the voltage at terminal 214 is equal to the voltage at output terminal 196 for a voltage at terminal 196 less than zero. When the voltage at output terminal 196 is greater than zero, the voltage at input terminal 214 is equal to zero. The resistor 212 protects the output of operational amplifier 198 from excessive current in the event of failure of the operational amplifier 216.

The operational amplifier 216 is connected at an input terminal 220 to a potentiometer 222 so that the operational amplifier 216 functions as a switching amplifier with a variable reference. Thus with this arrangement if the magnitude of the voltage at input terminal 214 is greater than the magnitude of the voltage between terminal 220, and the potentiometer 222 then the voltage output of diode 224 connected to amplifier output 218 is equal to +12 volts; otherwise, the voltage at the output of diode 224 is equal to −12 volts. Consequently, the critical di/dt level is adjusted by varying the reference voltage applied to potentiometer 222 by varying the setting of the potentiometer 222. Thus, the critical di/dt value is a function of the reference voltage applied to potentiometer 222. In this manner critical di/dt value can be adjusted, for example, between 28.5 amps/msec. to 253.2 amps/sec. for a reference voltage between 1 to 10. Further, the diode 224 allows only positive values of voltage to pass through to a trip latch circuit generally designated by the numeral 226 in FIG. 6.

Figure 6:
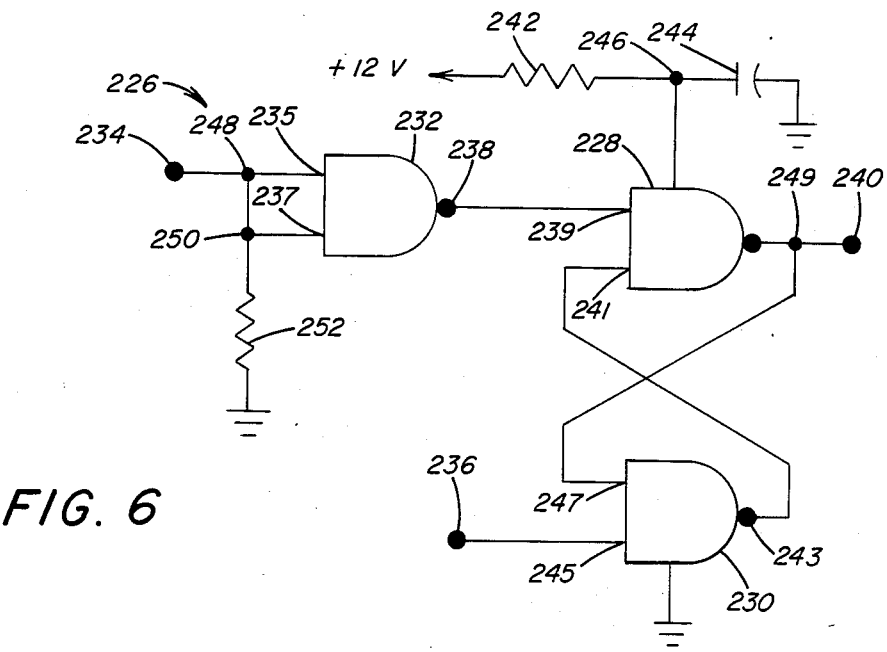
FIG. 6 is a schematic diagram of a circuit breaker trip latch circuit for the detection circuit.

The trip latch circuit 226 shown in FIG. 6 includes a plurality of nand gates 228–232. The gates 228 and 230 are connected as an R-S flip-flop latch. The gate 232 is connected to a terminal 234 which receives input voltage from the diode 224 of the sample and hold circuit 144 shown in FIG. 5.

The terminal 234 is connected through terminals 248 and 250 to input terminals 235 and 237 of gate 232. Output terminal 238 of gate 232 is connected to input terminal 239 of gate 228. Gate 229 also includes an input terminal 241 connected to output terminal 243 of gate 230. Gate 230 also includes an input terminal 245 connected to terminal 236, and an input terminal 247 is connected to an output terminal 249 of gate 228.

When a positive voltage is introduced at terminal 234 from diode 224, shown in FIG. 5, the voltage is inverted to a logic "0" by the gate 232 which operates as an inverter gate. When the voltage at terminal 236 to the gate 230 is set at a logic "1" and the voltage at output terminal 238 of the gate 232 momentarily becomes positive, the voltage at output terminal 240 is latched positive until the flip-flop latch formed by the gates 228 and 230 is reset. A resistor 242 and a capacitor 244 are connected to an output terminal 246 of the gate 228 to prevent the flip-flop latch from latching "on" when control power is applied to the circuit 226. It is further noted that the capacitor 244 is connected to ground, as well as, the gate 230. Terminals 248 and 250 are connected to the inputs to the gate 232 and are also connected to ground through a resistor 252.

Figure 7:
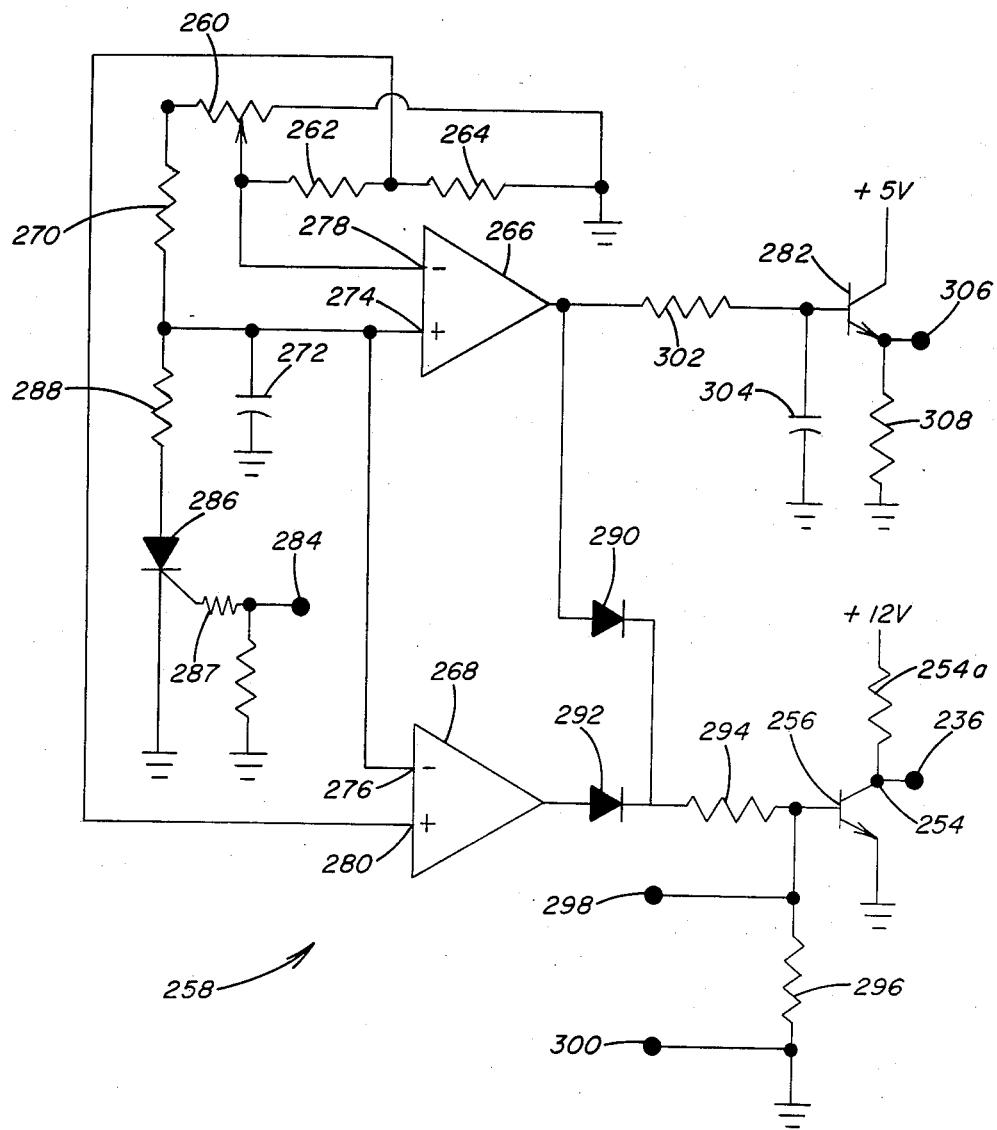
FIG. 7 is a schematic diagram of a reset timing circuit.

The input terminal 236 to gate 230 shown in FIG. 6 is connected to a follower terminal 254 of a transistor 256 of a reset timing circuit 258 shown in FIG. 7. The reset timing circuit 258 also includes a voltage divider circuit formed by resistors 260–264. This voltage divider circuit biases an operational amplifier 266 at a positive voltage, for example, 6.7 volts and an operational amplifier 268 at a positive voltage, for example, 6.5 volts. A resistor 270 charges a capacitor 272 to +12 volts at a rate determined by the product of resistor 270 and capacitor 272. The voltage across the capacitor 272 is applied to the input terminal 274 of amplifier 266 and the terminal 276 of amplifier 268.

The operational amplifiers 266 and 268 are connected to serve as switching operational amplifiers. The output of a switching operational amplifier is high, for example +12 volts, if the non-inverting input is at a more positive potential than the inverting input; otherwise, the output is zero volts. Normally the terminal 278 of the operational amplifier 266 is biased at +6.7 volts, the terminal 280 of amplfier 268 at +6.5 volts, and as a consequence a transistor 282 is switched to a conductive state, and the transistor 256 is switched to a non-conductive state.

When the critical rate of load current rise is exceeded, the voltage at a terminal 284 goes to +12 volts, and this voltage gates on an SCR 286 through a gate current limiting resistor 287. The voltage at terminal 284 corresponds to the voltage at terminal 234 of the trip latch circuit 226 shown in FIG. 6. While SCR 286 is energized, capacitor 272 is quickly discharegd through the resistor 288. When the capacitor 272 is completely discharged, the anode current through the SCR 286 is limited to a value less than the SCR latching current by resistor 270. Thus when the voltage at terminal 284 goes to zero, the SCR 286 is turned off immediately. When the SCR 286 is deenergized, the capacitor 272 is charged through the resistor 270. Preferably, the voltage at terminal 278 of amplifier 266 is biased at +6.7 volts so that the output of the amplifier 266 returns to +12 volts approximately 160 msec. after the load di/dt decreases below the critical value.

With the above arrangement, the voltage at terminal 280 of amplifier 268 is biased to +6.5 volts so that the output of the amplifier 268 returns to zero volts approximately 150 msec. after di/dt decreases below the critical value. The output of both the amplifiers 266 and 268 are connected through diodes 290 and 292 and resistor 294 to the input terminal of the transistor 256. Although not essential to the operability of this invention, resistor 254a limits the current flow through transistor 256 from the 12 V power supply. With this arrangement the output of the amplifiers 266 and 268 is fed to the trip latch reset gate terminal 236. Consequently, because the gate or terminal 236 is connected to nand gate 230, shown in FIG. 6, the trip latch flip-flip switch can only be reset when the voltage at terminal 236 is at a +12 volts potential. This external reset allows the circuit breaker trip latch circuit 226 to be reset by the opening of the contacts of the circuit breaker 28 shown in FIG. 1.

As further shown in FIG. 7, the input to the transistor 256 is also connected through a resistor 296 to ground. The resistor 296 is also connected to external reset terminals 298 and 300. Also the output from the operational amplifier 266 is connected through a resistor 302 to a capacitor 304 and the transistor 282 having an emitter connected to terminal 306 and through resistor 308 to ground.

The reset timing circuit 258 illustrated in FIG. 7 is thus operable to measure the net change in current from the time that the transient begins, for example, at t=zero until t=150 msec. The purpose of this delay is to allow downstream circuit breakers, fuses, or other protective devices to isolate the faulted circuitry rather than trip the main feeder circuit breaker. As discussed above with respect to FIG. 1, if a trolley system fault 34 were to occur, then the rate of rise detector would respond as the fault current rises at approximately 1,000 amperes/msec. Consequently, the feeder circuit breaker 28 opens to deenergize the mine personnel carrier 20, the dewatering pump 30, and the haulage locomotive 22. All of these devices receive dc power from the mine rectifier 18.

Preferably if the fuse 36 opens, then the faulted circuit would be isolated. The typical fuse fault clearing time is approximately 100 msec. Therefore, in order to accomplish this the load current is sampled at t=zero, i.e. when the load current transient caused by the fault begins, and at t=150 msec. Consequently, the net change in load current would be zero as the fuse 36 removes the faulted system, negating the need to open the feeder circuit breaker 28.

If the fuse fails to isolate the faulted circuit for any reason, the net change in current after 150 msec. would be large and the feeder circuit breaker 28 would be opened by the rate of rise detector in accordance with the present invention. Thus the feeder circuit breaker 28 trips only if the critical rate of load current rise is exceeded and the net change in current 150 msec. later is excessive.

Figure 8:
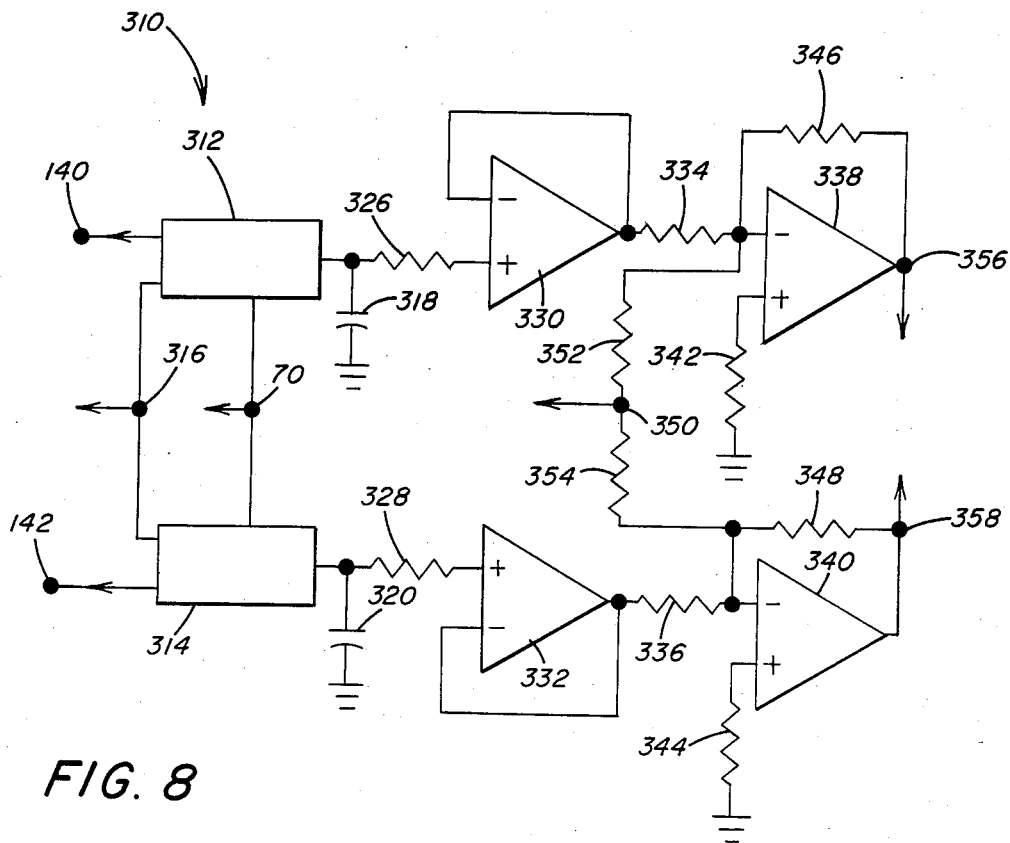
FIGS. 8 and 9 are schematic diagrams of a net change of current circuit used in the detection circuit.
Figure 9:
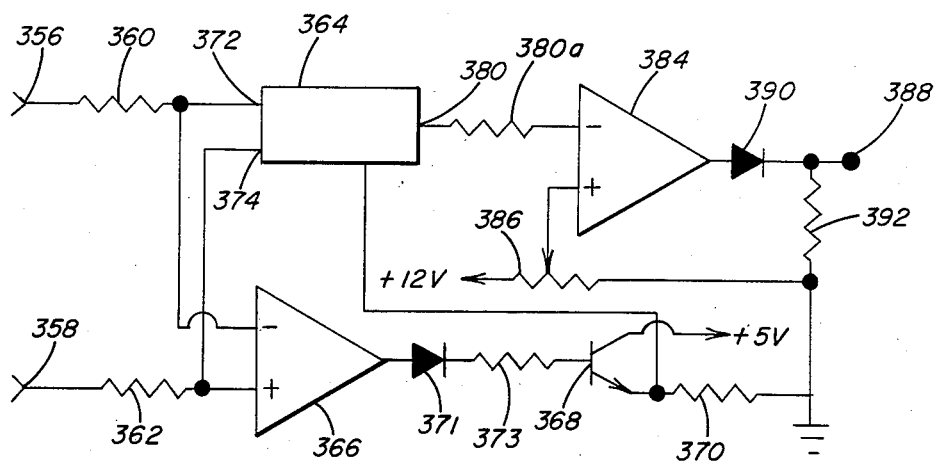

Now referring to FIGS. 8 and 9 there is illustrated a net change of current circuit generally designated by the numeral 310 in FIG. 8 which includes integrated circuits 312 and 314 which function as logically controlled field effect transistor switches. The circuits 312 and 314 are connected to the output terminal 70 of the voltage follower network 68 shown in FIG. 3 for the isolation amplifier section 40. The input voltage from terminal 70 shown in FIG. 8 is sampled and stored every 8.33 msec.

With the integrated circuits 312 and 314, when the sample and hold circuit as above described and illustrated in FIG. 5 determines that the critical rate of rise has been exceeded, the load current is already risen at least 277 amperes. If no additional load current sampling is done, this information (prior to t=zero) would be lost. Accordingly, the load current or voltage terminal 70 permits a critical rate of rise to be detected. For a load current which is changed by 300 amperes prior to t=zero, it continues to increase. When the critical rate of rise is exceeded, the voltage at terminal 316 between the two circuits 312 and 314 goes to zero thereby placing the circuits 312 and 314 in the "hold" mode. In the "hold" mode the voltages across capacitors 318 and 320, which correspond to the voltages applied to terminals 322 and 324 illustrated in FIG. 2, are sampled prior to t=zero.

Each of the circuits 312 and 314 are connected through resistors 326 and 328 to operational amplifiers 330 and 332, respectively, which are operable as voltage followers. The amplifiers 330 and 332 provide a high impedance input to capacitors 318 and 320 so that the stored voltages at terminals 322 and 324 shown in FIG. 2 will not be drained so that the output voltages of the operational amplifiers 330 and 332 shown in FIG. 8 correspond to the voltages at terminals 322 and 324 shown in FIG. 2.

The outputs of the operational amplifiers 330 and 332 shown in FIG. 8 are connected to resistors 334 and 336 to the inputs of summing amplifiers 338 and 340, respectively. The amplifiers 338 and 340 are also connected through resistors 342 and 344 to ground. Further, the input terminals and output terminals of each of the amplifiers 338 and 340 are connected through resistors 346 and 348, respectively.

In the circuit 310 shown in FIG. 8, the voltage applied to terminal 350 is the negative of the voltage at terminal 70 from the voltage follower network 68 in the isolation amplifier section 40 shown in FIG. 3. As discussed above, the voltage at terminal 70 shown in FIG. 3 is the load shunt input voltage multiplied by the input isolation amplifier gain. The value of the resistor 334 is equal to the value of resistor 352, and the value of resistor 342 is equal to the parallel combination of resistors 334, 352, and 346. The terminal 350 is also connected through a resistor 354 to the resistor 348 connected to the input and output of the amplifier 340. With this arrangement, the amplifiers 338 and 340 provide voltage outputs at terminals 356 and 358. The larger of the voltage outputs from terminals 356 and 358 represent the maximum net change in load current and these output voltages are responsive to the voltage applied to output terminal 70 shown in FIG. 3.

Now referring to FIG. 9 the terminals 356 and 358 described above in reference to FIG. 8 are connected through a pair of resistors 360 and 363 to the respective inputs of an analog switch 364 and an operational amplifier comparator 366. It should be noted that both the voltages applied to terminals 356 and 358 are applied to both the input of the analog switch 364 and amplifier 366.

If the voltage applied to terminal 356 is larger than that of terminal 358, then the output of the comparator 366 is low and a transistor 368 connected to the output of the comparator 366 is switched to a nonconductive state. With the transistor 368 in a nonconductive state the voltage across resistor 370 is zero, and this voltage is fed into the logically controlled switch 364 which functions as a field effect transistor switch. The terminals 372 and 380 of the switch 364 are tied together so that the voltages at terminals 376 and 378 shown in FIG. 2 are equal.

If the voltage at terminal 358 is higher than the voltage at terminal 356, then the output of the comparator 366 is high and the transistor 368 is switched to a conductive state. When the transistor 368 is conductive, the voltage across the resistor 370 is +5 volts. This has the effect of changing the state of the analog switch 364. Consequently, output terminal 380 of switch 364 and the terminal 374 are tied together internally so that the voltage at terminals 378 and 382 shown in FIG. 2 are equal. In either case the voltage at terminal 378, which is the voltage output of the analog switch 364, is higher than the two voltages at terminals 376 and 382 shown in FIG. 2.

An operational amplifier 384 shown if FIG. 9 is connected as a switching amplifier with a variable reference source provided by reference potentiometer 386 which is connected to an input terminal of the amplifier 384. Although not essential to the operability of this invention, resistor 380a connects the output of analog switch 364 to the negative input of operational amplifier 384 to limit the current flow to amplifier 384 if switch 364 should fail. If the voltage at terminal 378 shown in FIG. 2 is lower than the voltage selected by the potentiometer 386, then the output of the amplifier 384 at terminal 388 is +12 volts. If the net change of current is excessive, then the voltage at terminal 378 becomes higher than the reference voltage and the voltage at terminal 388 is zero volts. As further shown in FIG. 9 the output of the amplifier 384 is connected through a diode 390 to the output terminal 388 and through a resistor 392 to ground.

Once the circuit breaker trip latch formed by the circuit 226 shown in FIG. 6 has been set by an excessive load current rate of rise, one of two conditions occur. First, a fuse or other protective device isolates the fault, in which case, the net change in load current is zero. Second, the fault is not isolated and the circuit breaker trip latch is not reset.

Figure 10:
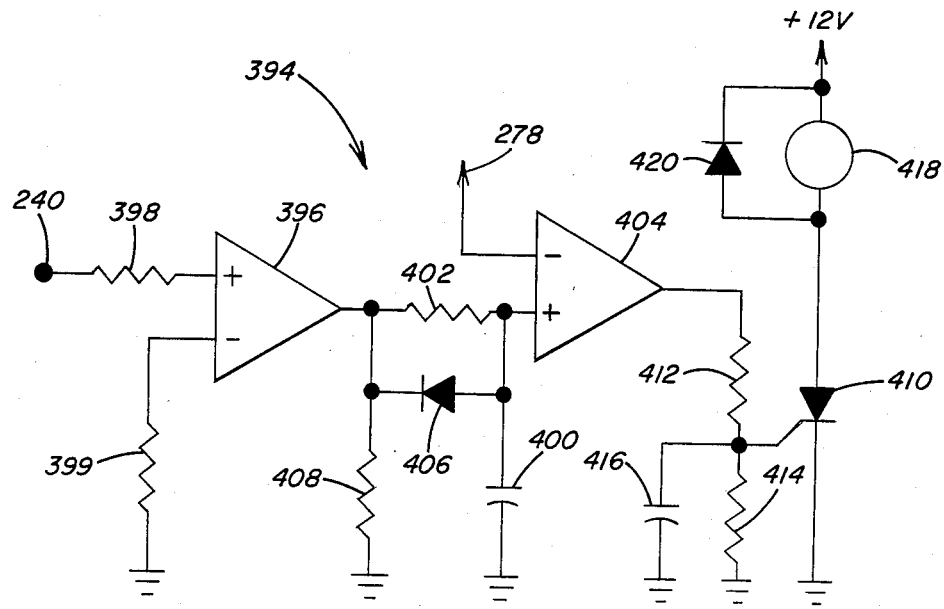
FIG. 10 is a schematic diagram of a trip output circuit.

A circuit breaker trip output circuit generally designated by the numeral 394 is illustrated in FIG. 10. Once the critical rate of load current rise has been exceeded, the voltage applied at terminal 240, which is also shown in FIG. 6, goes to +12 volts. An operational amplifier 396 is connected to terminal 240 through resistor 398. The amplifer 396 is also connected to ground through resistor 399.

The operational amplifier 396 functions as a signal follower to increase the output current capability from the terminal 240 of the trip latch circuit 226 shown in FIG. 6. When the output of the amplifier 396 is high, a capacitor 400 is charged through a resistor 402 as input to a second operational amplifier 404. This voltage is also applied to terminal 278 connected to the operational amplifier 266 of the reset timing circuit 258 shown in FIG. 7.

With the arrangement shown in FIG. 10, 160 msec. after the load current has exceeded the critical rate of rise, the output from the amplifier 404 is +12 volts. Also a diode 406 is connected in parallel with the resistor 402 between the amplifiers 396 and 404. The resistor 408 and the diode 406 are operable to quickly discharge the capacitor 400 if the circuit breaker trip latch is reset. The diode 406 is also connected through a resistor 408 to ground.

When the output of the amplifier 404 is at +12 volts, an SCR 410 is gated through a resistor 412. The resistor 414 and the capacitor 416 prevent extraneous noise from gating on the SCR 410. The SCR 410 energizes a relay 418 which includes normally closed contacts for tripping the load circuit breaker 28 shown in FIG. 1. A diode 420 connected across the relay 418 functions as a free-wheeling diode shunted across the operating coil of relay 418. With this arrangement transient voltage spikes are prevented from occurring when the relay 418 is deenergized.

Thus with the above described detection circuitry the rate of current rise can be used to distinguish between a low current fault and a high current, legitimate load on the coal mine trolley system 10. This type of fault detection system can be used for virtually any trolley system/load combination. The low current fault detection circuitry of the present invention makes it possible to detect resistance (arcing) fault magnitudes which are less than 20% of the circuit breaker static trip threshold, as a result the overall safety of the coal mine trolley system 10 is substantially improved. This system coordinates efficiently with other downstream fuses and circuit breakers of the trolley system 10. Thus, the rate of rise of current and the net current change in a given period of time are used as the criteria in determining if a fault is present on the trolley system.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. Apparatus for detecting a low level fault condition in an electrical system comprising,
   a circuit breaker connected in series with a direct current conductor,
   said circuit breaker being operable in a closed position to permit the flow of direct current through said direct current conductor and in the open position to terminate the flow of direct current through said direct current conductor,
   a load shunt connected in series with said direct current conductor so that direct current flows through said shunt to said direct current conductor,
   isolation means connected to said load shunt for generating an input signal proportional to the direct current flowing through said shunt, said input signal having a preselected waveform,
   means for selecting the peak values of said input signal waveform generated by said isolation means and synchronizing on said peak values to provide a plurality of individual output signals corresponding to said peak values of said input signal waveform, one said individual output signal being provided at the beginning of a preselected time interval and a following individual output signal being provided at the end of said preselected time interval, means for measuring the magnitude of said individual output signal provided at the beginning of said preselected time interval and the magnitude of said individual output signal provided at the end of said preselected time interval and determining the change in magnitude of said output signals over said time interval, comparator means for comparing said change in magnitude of said individual output signals to a preselected critical value of a change in magnitude over said preselected time interval to detect the presence of a critical rate of increase in said direct current through said shunt, and a trip circuit latched to said comparator means for monitoring the net change in direct current flowing through said shunt for a preselected period of time after said critical rate of increase in direct current flowing through said shunt is detected, said trip circuit being energized to open said circuit breaker and terminate flow of direct current therethrough when said critical rate of increase in direct current flowing through said shunt is detected and the net change in direct current at the end of said preselected period of time exceeds a preselected limit.

2. Apparatus as set forth in claim 1 in which said comparator means includes, a switching device activating said trip circuit to energize said circuit breaker to open when said critical rate of increase in direct current flowing though said shunt is detected and the net change in direct current at the end of said preselected period of time exceeds said preselected limit.

3. Apparatus as set forth in claim 2 which includes, means for adjusting said preselected critical value to a preselected level at which said switching device actuates said trip circuit to open said circuit breaker.

4. Apparatus as set forth in claim 1 which includes, a timing circuit for sensing the rate of increase in direct current flowing through said shunt for said preselected period of time being monitored by said trip circuit, said timing circuit being operable to transmit a trip signal proportional to the rate of increase of current such that a net change in said direct current flowing through said shunt exceeding said preselected limit at the end of said preselected period of time energizes said trip circuit to open said circuit breaker.

5. Apparatus as set forth in claim 4 which includes, a reset circuit for timing the rate of increase in said direct current flowing through said shunt so that in the event the net change in said direct current flowing through said shunt exceeds said preselected limit and said direct current increase terminates before said preselected period of time expires said timing circuit is reset to prevent opening of said circuit breaker.

6. Apparatus as set forth in claim 1 in which said circuit breaker includes, a relay having a pair of contacts, said contacts being normally closed to maintain said circuit breaker in a closed position, and an operating coil in said trip circuit associated with said relay, said operating coil when energized being operable to open said contacts of said relay and trip said circuit breaker to said open position, said operting coil being energized when said critical rate of increase in said direct current flowing through said shunt is detected and the net change in direct current at the end of said preselected period of time exceeds said preselected limit.

7. A method for detecting a low level fault condition in an electrical system comprising the steps of, feeding direct current from a power source to an electrical system by means of a direct current carrying conductor, isolating a fault condition in the electrical system without having to interrupt the entire flow of current to the conductor, detecting the presense of a fault condition in said electrical system by monitoring the rate of direct current rise through said direct current carrying conductor over a preselected time interval, comparing said rate of direct current rise over said preselected time interval to a preselected critical value of a rate of current rise to detect the presence of a critical rate of direct current rise through said conductor, measuring the increase in the amount of current through the direct current conductor at the end of a preselected period of time after said critical rate of direct current rise is detected, and interrupting the entire flow of direct current to said direct current conductor in the event the fault condition is not isolated in the electrical system when said rate of direct current rise exceeds said preselected critical value and said increase in the amount of direct current at the end of said preselected period of time after said critical rate of direct current rise is detected exceeds a preselected limit.

8. A method as set forth in claim 7 which includes, generating a reference signal representative of the preselected critical value of the rate of current rise, and adjusting the magnitude of the reference signal to vary the preselected critical value of the current rise at which the flow of current to the conductor is interrupted.

9. A method as set for in claim 7 which includes, measuring the net change in magnitude of the current flowing through the conductor between a first preselected time and a second preselected time after said critical rate of direct current rise is detected, and opening the contacts of a main circuit breaker to interrupt the entire flow of current through the conductor in the event said net change in current exceeds said preselected limit at the end of said second preselected time.

10. A method as set forth in claim 7 which includes, maintaining the contacts from the main circuit breaker in a closed position when the rate of current rise decreases below the critical value after the preselected time interval has elapsed, and opening the contacts of the normally closed circuit breaker when the rate of current rise is maintained at the critical value or above the critical value after the preselected time interval has elapsed.

11. A method as set forth in claim 7 which includes, delaying for a preselected time period the interruption of the entire flow of current through the conductor upon the occurrence of the fault condition to allow isolation of the fault condition in the electrical system, and interrupting the entire flow of current through the conductor in the event the fault condition is not isolated in the electrical system.

12. Apparatus for detecting a low level fault condition in a mine trolley system comprising,
   a trolley system circuit including a trolley wire supplying direct current to a plurality of direct current loads,
   a source supplying direct current to said trolley system circuit, said source being connected to said trolley system circuit by means of a direct current conductor,
   a circuit breaker positioned between said source and said trolley system circuit for interrupting all current flow to said trolley system circuit in the event of a fault condition in said trolley system circuit,
   fuses connected to each trolley system circuit load for isolating the fault condition in said load without the need to trip said circuit breaker and interrupt the entire flow of current to said trolley system circuit,
   a current detector positioned in said direct current conductor between said circuit breaker and said trolley system circuit for tripping said circuit breaker in the event the rate of direct current rise due to said fault condition exceeds a predetermined rate of direct current rise and the increase of current after an interval of time exceeds a predetermined limit,
   said current detector including means for measuring the net change in current from the time the fault condition occurs to a preselected time thereafter and comparing the net change in current with a predetermined rate of rise, and
   means for detecting and measuring the net change in current after said preselected time and tripping said circuit breaker when the net change in current detected exceeds said predetermined limit.

13. Apparatus as set forth in claim 12 which includes,
   isolation means connected to said current detector for isolating said current detector from voltage levels above a preselected magnitude in said trolley system circuit,
   said isolation means having an input terminal for receiving a signal representative of the fault condition and an output terminal for supplying said current detector with an input signal indicating a change in current in said trolley system circuit due to the fault condition.

14. Apparatus as set forth in claim 12 which includes,
   a clock circuit connected to said trolley system circuit receiving an input signal representative of the fault condition and operable to analyze said input signal to synchronize on the peak values of the input value, and
   said clock circuit including an input terminal connected to said current detector for providing an output signal thereto indentify the magnitude of said peak values and rate of change in said peak values over a selected period of time.

15. Apparatus as set forth in claim 12 in which said current detector includes,
   a sampling circuit for measuring the rate of change in current through the fault condition for a selected time interval and comparing the change in current to a reference voltage to determine if the change in current through the fault condition exceeds said predetermined rate of current rise.

16. Apparatus as set forth in claim 12 which includes,
   means for opening said circuit breaker in the event said fuse fails to open said trolley system circuit to isolate the fault condition,
   said means for opening said circuit breaker including means for delaying opening of said circuit breaker to permit operation of said fuse to open said circuit to isolate the fault condition for the condition when the net change in current detected over said preselected time is less than a reference value.

17. Apparatus as set forth in claim 12 which includes,
   means for sampling the rate of change in current through the fault condition at time equals zero and at time equals 150 msec.,
   means for preventing tripping of said circuit breaker when the net change in current after 150 msec. is zero,
   means for actuating tripping of said circuit breaker when the net change in current after 150 msec. exceeds said predetermined limit.

18. Apparatus as set forth in claim 12 which includes,
   a circuit breaker trip circuit connected between said current detector and said circuit breaker for controlling operation of said circuit breaker in response to the operation of said fuse to isolate the fault condition,
   said circuit breaker trip circuit being activated once the rate of current rise exceeds said predetermined rate in the event said fuse fails to isolate the fault condition after an excessive net change in the current is detected,
   said circuit breaker including normally closed contacts,
   said contacts being connected to said circuit breaker trip circuit such that when said trip circuit is activated said normally closed contacts are opened to interrupt current flow to said trolley system circuit.

* * * * *